United States Patent
Gurwell et al.

[11] 4,033,400
[45] July 5, 1977

[54] METHOD OF FORMING A COMPOSITE BY INFILTRATING A POROUS PREFORM

[75] Inventors: William E. Gurwell, West Bloomfield, Mich.; Amos J. Shaler, State College, Pa.

[73] Assignee: Eaton Corporation, Cleveland, Ohio

[22] Filed: Apr. 3, 1974

[21] Appl. No.: 457,540

Related U.S. Application Data

[63] Continuation-in-part of Ser. No. 376,503, July 5, 1973, abandoned.

[52] U.S. Cl. ............................ 164/98; 164/120
[51] Int. Cl.² ................................ B22D 19/02
[58] Field of Search ............... 29/191.4, 182.1; 164/98, 100, 108, 109, 110, 111, 112, 97, 284, 120, 319, 303, 312; 75/205, 200; 249/127; 425/354, 353, 405 H

[56] References Cited

UNITED STATES PATENTS

| | | | |
|---|---|---|---|
| 3,262,761 | 7/1966 | Bechtold | 75/205 X |
| 3,547,180 | 12/1970 | Cochran et al. | 164/97 X |
| 3,551,991 | 1/1971 | Reich et al. | 29/182.1 X |
| 3,779,715 | 12/1973 | Wenoler et al. | 29/182.1 |
| 3,864,154 | 2/1975 | Gazza et al. | 29/182.1 X |

FOREIGN PATENTS OR APPLICATIONS

| | | | |
|---|---|---|---|
| 204,945 | 1/1957 | Australia | 164/120 |
| 85,150 | 12/1935 | Sweden | 164/284 |

*Primary Examiner*—Ronald J. Shore
*Assistant Examiner*—Gus T. Hampilos
*Attorney, Agent, or Firm*—Teagno & Toddy

[57] ABSTRACT

A biskeletal composite is created by forming a skeletal host body of reaction bonded silicon nitride, heating an infiltrant material, and applying pressure to such infiltrant to thereby force such infiltrant into the void volume of the porous host body. In one aspect of the method, the application of pressure is done rapidly to impart desirable characteristics to the composite.

4 Claims, 24 Drawing Figures

METHOD OF FORMING A COMPOSITE BY INFILTRATING A POROUS PREFORM

BACKGROUND OF THE APPLICATION

This application is a continuation-in-part of Ser. No. 376,503 filed July 5, 1973, now abandoned.

BACKGROUND OF THE INVENTION

Heretofore, it has been known, as evidenced by the development of the field of cermets that, generally, a mixture of ceramic and metallic components into a single product may, and often does, result in such product having physical properties not found solely in either one of the components. Generally, such products combine strength of the metal with the heat, wear and oxidation resistance of the ceramic material.

One of the most difficult problems in the field of cermets (sometimes referred to as metal-reinforced or metal-filled ceramics) is to reduce or eliminate porosity within the resulting composite material.

Generally, in the past, cermets were made by sintering a compacted mixture of metal and ceramic powders. However, during the sintering process an oxide film forms on the metal and inhibits its complete infiltration into the resulting ceramic matrix. Such a method, more often than not, produces metal-reinforced ceramics with 10 to 15% void space volumes. The void spaces decrease the effective cross-sectional area of the cermet and act as stress concentrators. Consequently, such prior art cermets, having such undesirable voids, are often limited in their use to applications not requiring high material strength and impact resistance.

The prior art has attempted to overcome such problems by proposing various methods by which, hopefully, the void spaces would be reduced or eliminated. One such method proposed by the prior art includes taking ceramic powder and first pressing it to form a porous compact of a desired configuration. The compact and a quantity of filler metal are placed within a vacuum chamber which, in turn, is heated to a temperature above the melting point of the metal (often to 1½ times the metal melting temperature) and is evacuated to a pressure below $10^{-6}$ torr. The vacuum encourages the dissociation of the oxide film from the metal surface allowing the molten metal to flow more freely into the void spaces of the ceramic compact.

Some cermets or metal-filled ceramics formed by the above vacuum impregnation process have exhibited a porosity, in terms of void spaces, of only 3 percent. However, the prior art has also indicated that to achieve even such results the attainment of a vacuum of less than $10^{-6}$ torr. is essential. With a "torr" being defined as 1/760 of an atmosphere, it can be seen that the above vacuum impregnation process requires ultra-high vacuum so that the pressure within the vacuum chamber would be in the order of or less than 0.0000000193 psia. Obviously, the attainment of such a high vacuum requires sophisticated equipment which, when combined with the temperature requirements of the process preclude the ready adoption of the vacuum impregnation process to rapid production requirements, especially when it is remembered that the resulting cermet still contains a significant porosity in terms of void spaces.

The prior art has also reasoned that when cermets are formed as by the application of heat and pressure to an admixture of powdered ceramic material and powdered metal, void spaces created therein result from the frictional resistance afforded by the individual particles of powdered metal and powdered ceramic material during the application of pressure thereto. That is, the frictional resistance (or interference caused by the particular geometric configuration of such particles) prevents the powder particles from moving sufficiently freely with respect to each other as to minimize or eliminate significant void spaces therebetween. The prior art has suggested that this problem of void spaces, if caused in accordance with the above postulated theory, could be overcome as by the addition of suitable adjuvants to the admixture of powdered metal and ceramic material. However, this method has not been accepted, especially beyond laboratory requirements such as in commercial production, because of additional problems. That is, the inclusion of pressing adjuvants requires adjuvants of essentially highest purity and is further limited to that group of additives which are not reduceable oxides since any substantial quantity of impurity causes the mechanical equivalent of a void space at the location of such impurity within the resulting cermet while such oxides, because of the temperatures required of the process, chemically react with the primary metal or metal alloy of the resulting cermet forming inclusions, which effectively reduce the strength of the cermet.

Accordingly, the invention as herein disclosed and described is primarily directed to the solution of the above as well as other related problems.

SUMMARY OF THE INVENTION

Article

According to the invention a composite material comprises a biskeletal composite having a first three-dimensional porous skeletal host body of ceramic material, and a second three-dimensional body infiltrated within the host as to be substantially complementary thereto and therewithin, said second body being formed of metallic material.

Method

According to the invention a first method for forming a composite material in accordance with the above, comprises the steps of forming a host body having a skeletal configuration, placing an infiltrant in surface-to-surface contact with said host, melting said infiltrant, and applying a pressure against said molten infiltrant to thereby force said molten infiltrant to infiltrate said host and form a second body portion generally within said host body complementary thereto and allowing it to cool and solidify.

Also according to the invention, a second alternative method comprises the same steps as the first method and further comprises the steps of reheating the second body portion, remelting the infiltrant and allowing it to cool and solidify.

A third, further alternative method comprises the same steps as the first method except that the pressure is released while the temperature of the infiltrant is above its melting point, whereupon the infiltrant is allowed to cool and solidify.

Apparatus

According to the invention an apparatus is employed in producing the article, by the methods described, which includes axial and peripheral sealing means received in a force transmitting device and disposed about the host in a relationship defining a cavity adjacent to the host into which the infiltrant is placed. The sealing means are fabricated from a material impervious to the flow of molten infiltrant and sufficiently resilient to effect displacement of the infiltrant into the host upon the application of a force along the axis of the infiltrant cavity.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain elements or details may be omitted from one or more views.

DETAILED DESCRIPTION OF THE PREFERRED EMBODIMENTS

It has been discovered that cermets or composite materials of various particular required physical characteristics can be produced, even on a mass production scale with assured repeatability, by selectively employing a monoskeletal host and infiltrating within such host at least a second substance so as to form a second skeletal network therewith generally complementary to the skeletal configuration of the monoskeletal host. This has been found not only possible, but economically feasible even where the prior art has considered either the infiltrant as being incapable of wetting the host skeletal structure or where the host itself exhibits non-wetting characteristics.

For example, it has been discovered that a host comprised of silicon nitride can be infiltrated with a metal or metal alloy infiltrant in such a manner as to result in a composite material having physical properties or characteristics not found in either the silicon nitride or the infiltrant, singly. Such a resulting product may be defined as a biskeletal composite; that is, it is a body containing intertwined skeletons of two or more phases which do not necessarily totally interact with one another.

More specifically, it has also been discovered that, in employing silicon nitride as the host, for example, the silicon nitride may be first formed into a porous host or body as by reaction bonding and that thereafter the selected infiltrant, heated above its liquidus temperature, the lowest temperature at which it is completely molten, may be infiltrated into the host by the application of suitable pressure to the infiltrant as by, for example, related mechanical press type means.

Biskeletal products thusly produced have a high degree of infiltration (with 100% filling of void spaces having been achieved) at least equal to and often surpassing the results achieved by the most expensive and sophisticated methods proposed by the prior art. Selected examples of such biskeletal composite materials are hereinafter described in detail.

Still referring to silicon nitride and aluminum for purposes of illustration, the preferred method of forming such a biskeletal composite material is generally as follows. In forming the silicon nitride host, silicon powder (which may have a purity consistent with readily available commercial grades) of a size able to pass through a No. 200 mesh (which would be a particle size generally less than 75.0 microns) is mixed with a suitable binder. (It should be pointed out that in certain applications and situations a preferred particle size of silicon powder is 20.0 microns or less.) The binder may, for example, be any of many organics such as a phenolaldehyde resin, a paraffin, a stearic acid, a polyethylene wax or polyvinyl alcohol, with such binders being in an amount up to 20% by weight. In using such binders, the most preferred proportion thereof is from 1.0% to 5.0% by weight.

It has also been discovered that excellent results are obtained by using phenol-aldehyde resin in a preferred proportion in the order of 4.0% by weight. Such a thermoplastic phenol-aldehyde type resin may be obtained primarily by the use of acid catalysts and excess phenol. It is generally alcohol-soluble and requires reaction with, for example, hexamethylenetetramine or paraformaldehyde for conversion to cured cross-linked structures as by heating to 200° – 400° F. For purposes of illustration, if 4% by weight of the phenolaldehyde is employed, then, in the preferred method, 95.5% by weight silicon powder is used along with 0.5% by weight of hexamethylenetetramine.

In any event, the silicon powder and binder are then thoroughly mixed as, for example, by blending or ball milling either in a dry state or, if desired, with a solvent which is subsequently evaporated. Even though in the preferred method such mixing or blending may last in the order of 20 hours at ambient temperatures of 70° –80° F., the length of time for thorough mixing and coating may be significantly reduced (regardless of the particle size and binder employed) by heating as to increase the temperature of the mass being mixed.

After the silicon powder has been mixed and coated, it is pressed, in any suitable manner, into a powder compact of selected configuration. Even though pressures of up to 60,000 psi have been employed, the preferred range of pressures, especially in regard to silicon powder, is 1,000.0 to 20,000.0 psi so as to obtain a range of densities of such a compact from 0.6 gms./c.c. to 1.7 gms./c.c. with the preferred range of density being from 0.8 gms./c.c. to 1.6 gms./c.c. In the event that a phenol-aldehyde is employed as the binder, the coated silicon powder while so being formed into the resulting compact is heated to a temperature in the range of 300° – 450° F. in order to obtain curing of the resin as previously generally set forth. However, if, for example, the other previously identified binders are employed the pressing of the powder compact may be carried out at ambient room temperatures.

In any event after the silicon powder compact is formed it is reaction bonded as by placing such compact within a nitrogen atmosphere and heated to a temperature in the range of 2000.0° F. to 2900.0° F. for a length of time of from 4.0 hours to 100.0 hours. If the binder is a phenolic resin then best results are obtained by first slowly heating such compact to a temperature in the range of 1100° F. to 1300° F. to burn out the resin before progressing to the said range of 2000° F. to 2900° F. However, it has also been discovered that excellent results are obtained, after the binder has been burned out, by heating the compact to a first relatively lower temperature and maintaining that temperature for a first length of time and then heating it to a second relatively higher temperature and maintaining that temperature for a second length of time. For example, it is further preferred that such powder compacts be first heated to a temperature on the order of 2,460° F. for a duration on the order of 24.0 hours and then elevated to a temperature in the order of 2,640° F. for about 16.0 hours. Upon completion of the above, the resulting product is reaction bonded silicon nitride.

The reaction bonded silicon nitride host is then placed within suitable press means, along with the selected infiltrant which is heated to a temperature above its melting point. Pressure is then applied to the liquid infiltrant, as by actual physical displacement thereof, to force the infiltrant into the host. However, it should be pointed out that it is generally desirable and preferred to limit the amount of chemical reaction between the molten infiltrant and the silicon nitride host; this is done by keeping the temperature relatively low as, for example, within 100° F. above the infiltrant's liquidus temperature.

The time duration of the actual infiltration portion of the overall cycle depends on various factors such as the depth to which infiltration is to be accomplished (the thickness of the host body), the desired thickness of the film of product formed by reaction between the infiltrant and the host material, the pore size of the host, the degree of wetting between the host and infiltrant, as well as the viscosity of the infiltrant itself. Generally, the shorter the time, the lower the cost. Accordingly, it has been found that a pressing or infiltration cycle portion on the order of 10.0 minutes is sufficient for most situations. In tests employing a ½ inch thick host of reaction bonded silicon nitride (3.0 inches in diameter) and any of the following infiltrants, it has been determined that such an infiltration can be achieved within a length of time in the order of 4.0 minutes. Such infiltrants employed in the tests were:

| Infiltrant | Preferred Temperature Range |
| --- | --- |
| A13 Aluminum | 1080°/1280° F. |
| 2024 Aluminum | 1180°/1380° F. |
| A132 Aluminum | 1150°/1350° F. |
| 201 Aluminum | 1200°/1400° F. |
| LA-141 Magnesium | 1095°/1295° F. |
| HM-131 Magnesium | 1202°/1402° F. |
| AZ-31 Magnesium | 1170°/1370° F. |
| Aluminum Bronze | 1840°/2040° F. |
| Silicon Bronze | 1880°/2080° F. |
| Nickel - 11% Silicon | 2100°/2300° F. |
| Fine Silver | 1761°/1961° F. |

Figure 1:
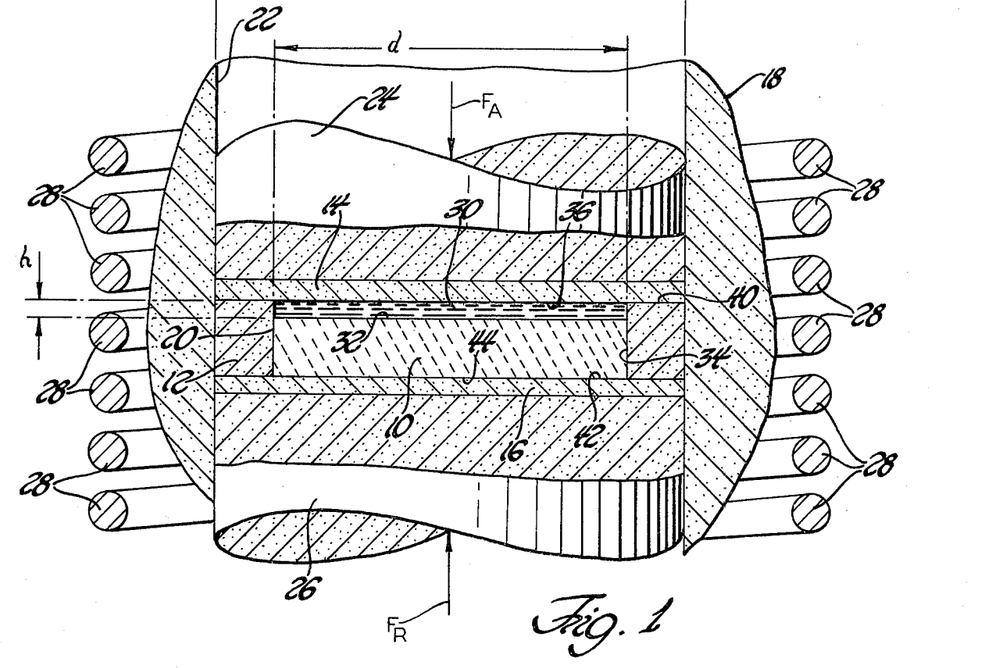
FIG. 1 is a fragmentary cross-sectional view of apparatus employable in producing composite material products in accordance with the inventive concepts.

FIG. 1 illustrates, in somewhat simplified form, a press arrangement whereby infiltration of a host by a suitable infiltrant can be accomplished. In FIG. 1, a porous monoskeletal reaction bonded host 10 is shown generally confined by a peripheral seal 12 and axially confined by sheet or platelike seals 14 and 16. All of such are, in turn, contained or confined within a suitable press structure which preferably may include an overall confining body 18 of solid high-density high-temperature refractory material such as, for example, graphite. Even though it should be apparent that the host 10 may be of another desired configuration it is assumed, especially for ease of illustration, that the host 10 is of a disc configuration having a circular periphery 20 and that the chamber 22 defined by housing or body 18 is cylindrical. Therefore, with such assumed configurations, seal members 14 and 16, being complementary, would be of disc configuration having a diameter D generally equal to the outer diameter of the peripheral seal 12 which, of course, would then be of ringlike configuration.

An upper ram or punchlike member 24 is slideably received within cylinder 22 and is acted upon by any associated mechanism, as is well known in the art, to cause member 24 to transmit a downward applied force $F_a$. An illustrated lower disposed member 26 can, functionally, be considered as a fixed member for producing a reaction force $F_r$ opposite and equal to $F_a$.

In the preferred arrangement, members 24 and 26 and housing or container 18 are formed of a highly dense, high-heat resistant material such as graphite. The end seals 14 and 16 and the peripheral seal 12, on the other hand, are formed of high-heat resistant material possessing an effectively closed cellular structure which is also compressible. One such form of material is commercially available under the tradename or trademark "Grafoil" and is generically designed as a flexible graphite. ("Grafoil" is a trademark of the Union Carbide Corporation having offices in the City of New York, N.Y. and in the City of Chicago, Ill.) The Carbon Products Division of Union Carbide Corporation, by its "Technical Information" Bulletin No. 524–203La (also bearing a code number of: CP-4252; 3.5M971) sets forth the various properties of such Grafoil graphite. Some of the more significant properties of Grafoil graphite are:

| | |
| --- | --- |
| Density | 70.0 lb./ft. |
| Melting point | Does not melt; Sublimes at 6600° F. |
| Helium Admittance | $2 \times 10^{116\ 4}$ cm.$^2$/sec. |
| Thermal Conductivity at 2000° F. | |
| (a) Surface plane | 25BTU-ft/hr/ft$^2$/° F. |
| (b) Through thickness | 2BTU-ft/hr/ft$^2$/° F. |

Generally, Grafoil graphite is a low density flexible graphite having anisotropic properties and is also similar to other graphites in its ability to withstand temperatures in the order of 6600° F. Having anisotropic properties the crystalline arrangement is such as to functionally define a closed cellular structure thereby effectively preventing the existence of any leak path therethrough for fluids or liquids even when such are applied at high pressures.

Although Grafoil is specifically referred to, it should be made clear that this particular material is only exemplary of the preferred seal material and that the inventive concepts herein disclosed may be practiced with other materials, such as an elastomer or vermiculite.

Still referring to FIG. 1, any suitable heating means such as induction heating coil means 28 may be provided in order to bring the infiltrant to a molten state as depicted at 30. It should be observed that a chamber (in this assumed instance a cylindrical chamber) is cooperatively defined as between the top surface 32 of host 10, inner peripheral surface 34 of ring seal means 12 and the lower surface 36 of upper seal 14. This is made possible as by having the upper surface 40 of the ring sealing means 12 a distance, h, above the upper surface 32 of host 10.

In operation, after the various components described above, or their equivalents, are assembled (with the infiltrant 30 also being positioned within the above-described chamber) heat is applied as by coil means 28 to melt the infiltrant after which associated mechanism (not shown) is activated in order to have upper member 24 start to apply a force $F_a$ thereagainst.

It may be that at this time the liquid infiltrant 30 does not completely fill the chamber in which it is contained. Therefore, if such is the case, the initial force applied by the flat end surface 38 of member 24 will be that magnitude sufficient to axially compress the peripheral sealing means 12 as to cause the upper surface 40 thereof to approach and attain the axial position of the relatively lower upper surface of the liquid infiltrant. In any event when such a relationship between the surface 40 and upper surface of the liquid infiltrant 30 is attained, the chamber containing the liquid infiltrant is completely filled and any further downward movement of the ram or punch means 24 will require the exertion of an applied force $F_a$ of greater magnitude. However, as is apparent, such further downward movement of member 24 causes a physical displacement of the liquid infiltrant 30 causing it to infiltrate the porous skeletal host 10.

Generally, the total magnitude of the applied force $F_a$ may be expressed as follows:

$$F_a = P_s (A_s) + P_I (A_I)$$

where:
$A_s$ = the area of the upper surface 40 of peripheral seal 12;
$P_s$ = the pressure applied to area $A_s$;
$A_I$ = the area of the upper surface of the infiltrant 30; and
$P_I$ = the pressure applied to area $A_I$.

Accordingly, it can be seen that as axial compression of peripheral sealing means 12 takes place and surface 40 thereof more nearly approaches the elevation of upper surface 32 of skeletal host 10, the magnitude of force $F_a$ increases to compensate for the continued generally resilient compression of sealing means 12 as well as the force required to infiltrate the liquid infiltrant into host 10.

In the preferred arrangement, the height differential, h, is purposely selected as to provide for the attainment of a preselected pressure as between the upper surface 40 of peripheral sealing means 12 and the lower surface 36 of upper seal 14. It has been discovered that if the height differential, h, should be so selected as to result in a pressure $P_s$ which is greater than pressure $P_I$, at the instant that $P_I$ is created. Excellent sealing characteristics are achieved as between surfaces 40 and 36 if $P_s$ is equal to twice $P_I$.

The total required pressure to achieve the desired infiltration depends upon many factors among which are the vicosity of the infiltrant, the pore size of the skeletal-porous host and the degree of wetting between the host and infiltrant. For example, an applied pressure of 2100 psi has been found satisfactory for some infiltrants such as, for example, alloys of magnesium and aluminum with virtually all porosity of the host being filled. However, the same pressure of 2100 psi has been found to be insufficient to achieve complete filling of all host porosity with the infiltrant being, for example, alloys of copper, nickel or silver. Such require, for effectively the same host characteristics, an elevated pressure to achieve comparably the same results.

Because of the resilient compressibility of the material of seals 12, 14 and 16, during the portion of the overall cycle in which the infiltrant is being forced into the skeletal host 10, some flow of such liquid infiltrant may take place as between the outer periphery 20 of host 10 and inner surface 34 of seal 12 and possibly between the lower surface 44 of host 10 and the upper surface 42 of lower seal 16. If this happens, the closed cellular characteristics of seals 16, 14 and 12 prevent the passage of infiltrant therethrough and therefore, because of the existing fluid pressure, cause such liquid infiltrant to infiltrate the host 10 along such surfaces 20 and 44.

Figure 2:
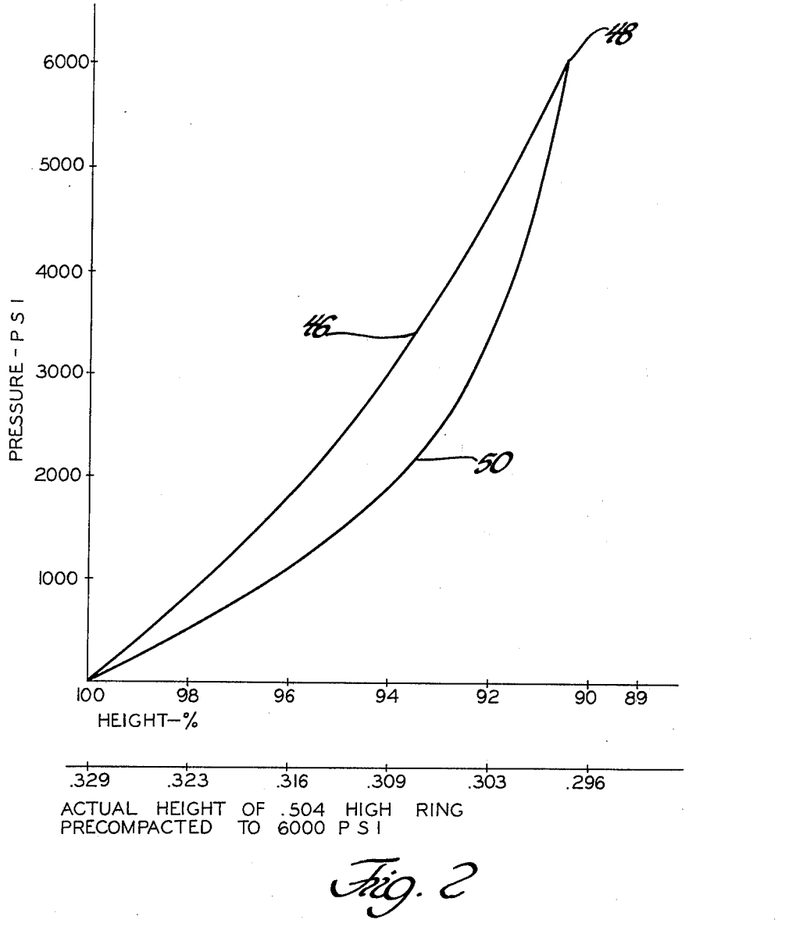
FIG. 2 is a graph depicting the resilient characteristics of certain of the elements shown in FIG. 1.

The graph of FIG. 2 illustrates the compressive generally resilient behavior of the sealing means 12 of FIG. 1. The data employed in constructing the curves of the graph were obtained by employing a ring seal of nominally ½ inch height (actual measurement of 0.504 inch) and first compacting it by an initial pressure of 6000 psi. Thereafter, the pressure was removed and height or thickness to which the ring seal returned (in this case an actual measurement of 0.329 inch) was then employed as the "zero" or reference point for subsequent applications of pressure and resulting deflections in order to determine curve 46 until some point 48 was attained, and then to incrementally reduce the pressure and record the resulting deflection to thereby obtain curve 50. Accordingly, it was discovered, as depicted in FIG. 2, after the Grafoil type material is first precompacted that subsequent applications of force thereto will result in such material exhibiting springlike characteristics with curves 46 and 50 respectively depicting the loading and unloading characteristics.

Figure 3:
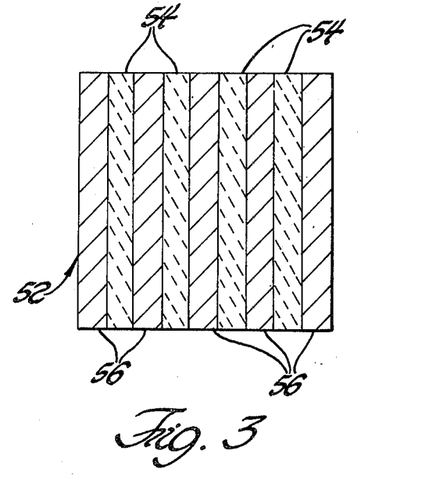
FIG. 3 is a schematic illustration of the mechanical equivalent of a composite material formed in accordance with the teachings of the invention.
Figure 4:
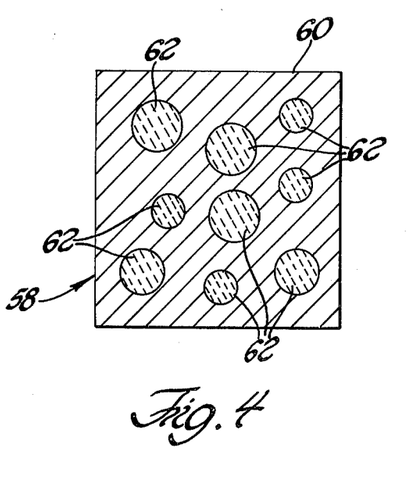
FIG. 4 is a schematic illustration of the mechanical equivalent of a cermet formed in accordance with the prior art.

In any event, once the infiltration process is completed the infiltrated composite product, in the example considered, is biskeletal. FIG. 3 is a two-dimensional simplified schematic representation or diagram of a mechanical equivalent of the biskeletal composite product according to the invention while FIG. 4 is the same type of representation illustrating for comparison, the prior art. As generally mechanically equivalently depicted, the composite product 52 of FIG. 3 has biskeletal portions 54 and 56 wherein 54 depicts the original monoskeletal host (as the reaction bonded silicon nitride) and 56 depicts the infiltrated infiltrant. In comparison the prior art composite or cermet height is essentially monoskeletal (such skeleton being formed of metal 60) with the ceramic material 62 being dispersed therewithin in disconnected individual particles or portions of varying dimensions. 50.

Various biskeletal composite materials were produced in accordance with the inventive concepts herein disclosed. By way of examples, at least the following composite materials were produced having compositions of the indicated relative percentages by volume:

| Example - 1 | | Example - 2 | |
|---|---|---|---|
| $Si_3N_4$ | 78% | $Si_3N_4$ | 69% |
| A13 Al | 18% | A13 Al | 28% |
| Porosity | 4% | Porosity | 3% |
| Example - 3 | | Example - 4 | |
| $Si_3N_4$ | 64% | $Si_3N_4$ | 52% |
| A13 Al | 32% | A13 Al | 44% |
| Porosity | 4% | Porosity | 4% |
| Example - 5 | | Example - 6 | |
| $Si_3N_4$ | 42% | $Si_3N_4$ | 64% |
| A13 Al | 54% | A132 Al | 33% |
| Porosity | 4% | Porosity | 3% |
| Example - 7 | | Example - 8 | |
| $Si_3N_4$ | 64% | $Si_3N_4$ | 64% |
| 2024 Al | 33% | Al-Bronze | 30% |
| Porosity | 3% | Porosity | 6% |
| Example - 9 | | Example - 10 | |
| $Si_3N_4$ | 64% | $Si_3N_4$ | 78% |
| High Si Bronze | 29% | High Si Bronze | 16% |
| Porosity | 7% | Porosity | 6% |
| Example - 11 | | Example - 12 | |
| $Si_3N_4$ | 65% | $Si_3N_4$ | 65% |
| HM31A Mg | 31% | AZ31B Mg | 35% |
| Porosity | 4% | Porosity | 0% |
| Example - 13 | | Example - 14 | |
| $Si_3N_4$ | 78% | L30D Graphite | 65% |
| LA141A Mg | 15% | A13 Al | 23% |
| Porosity | 7% | Porosity | 12% |

| Example - 15 | |
|---|---|
| S30D Carbon | 68% |
| A13 Al | 20% |
| Porosity | 12% |

With regard to the above Examples, the various compositions are further defined as:

A. in each instance, $Si_3N_4$ is reaction bonded silicon nitride;

B. A13 Al, is a designation for an aluminum alloy containing approximately 12–13% silicon by weight and having a liquidus/solidus of 1080°/1065° F.;

C. A132 Aluminum is a designation for an aluminum alloy containing, as major alloying elements, approximately 12% silicon, 2.5% nickel, 1.2% magnesium and 0.8% copper by weight and having a liquidus/solidus of 1050°/1000° F.;

D. 2024 Aluminum is a designation for an aluminum alloy containing, as major alloying elements, approximately 4.5% copper, 1.5% magnesium, and 0.6% manganese by weight and having a liquidus/solidus of 1180°/935° F.;

E. High silicon bronze designates bronze containing 3% silicon, by weight, as the alloying element and having a liquidus/solidus of 1880°/1780° F.;

F. Aluminum-bronze designates bronze containing, as major alloying elements, approximately 9% aluminum and 3% iron by weight and having a liquidus/solidus of 1840°/1800° F.;

G. LA141A Mg is a magnesium base alloy containing, as major alloying elements, 14% lithium and 1.5% aluminum by weight and having a liquidus/solidus of 1095°1060° F.;

H. AZ31B Mg is a magnesium base alloy containing, as major alloying elements, 3% aluminum, 1% zinc and 0.2% manganese by weight and having a liquidus/solidus of 1170°/1120° F.;

I. HM31A Mg is a magnesium base alloy containing, as major alloying elements, 3% thorium and 1.2% manganese by weight and having a liquidus/solidus of 1202°/1121° F.;

J. L30D Graphite is a commercial designation by the Stackpole Carbon Company of St. Marys, Pa., for block graphite having the following characteristics: density of 1.45 gms./c.c.; flexural strength of 5.3 ksi; elastic modulus of $1 \times 10^6$ psi; compressive strength of 26.0 ksi; modulus of resilience of 21.0 in-lb./in$^3$; impact energy of 0.34 ft-lb./in$^2$; and a critical strain of 0.65%; and K. S30D Carbon is a commercial designation by the Stackpole Carbon Company of St. Marys, Pa., for block carbon having the following characteristics: density of 1.34 gms./c.c.; flexural strength of 6.5 ksi; compressive strength 26.0 ksi; elastic modulus of $1 \times 10^6$ psi; modulus of resilience of 21.0 in-lb./in$^3$; impact energy of 0.34 ft-lb/in$^2$; and critical strain of 0.65%.

Specimens of the above Examples were subjected to various tests the results of which are as follows:

| Specimen of Example: | -1- | -2- | -3- | -4- | -5- |
|---|---|---|---|---|---|
| Density in gms/cc | 2.98 | 2.92 | 2.90 | 2.84 | 2.79 |
| Efficiency of Infiltration | 84% | 86% | 89% | 92% | 94% |
| Flexural Strength (ksi) | 62. | 56. | 54. | 55. | 45. |
| Compressive Strength (ksi) | 209. | NA* | 190. | NA* | NA* |
| Elastic Modulus ($10^6$ psi) | 41. | 32. | 30. | 27. | 23. |
| Modulus of Resilience (in-lb./in$^3$) | 47. | 49. | 48. | 55. | 44. |
| Impact Energy (ft-lb./in$^2$) | NA* | 1.67 | NA* | 2.30 | 1.82 |
| Area of Flexural Curve (in-lbs) | NA* | 640. | 564. | 774. | 746. |
| Critical Strain | 0.15% | 0.18% | 0.18% | 0.20% | 0.20% |
| Hardness Rockwell-A | 84 | 80 | 77 | 67 | 60 |
| Wear ($10^{-9}$in.$^3$) | 10. | 719. | 715. | 771. | 1021. |

| Specimen of Example: | -6- | -7- | -8- | -9- | -10- |
|---|---|---|---|---|---|
| Density in gms/cc | 2.91 | 2.95 | 4.35 | 4.63 | 3.85 |
| Efficiency of Infiltration | 91% | 91% | 84% | 81% | 72% |
| Flexural Strength (ksi) | 58. | 63. | 65. | 37. | 40. |
| Compressive Strength (ksi) | NA* | NA* | 217. | NA* | NA* |
| Elastic Modulus ($10^6$ psi) | 30. | 30. | 31. | 31. | 35. |
| Modulus of Resilience (in-lb./in$^3$) | 57. | 67. | 68. | 22. | 23. |
| Impact Energy (ft-lb./in$^2$) | 1.88 | 1.20 | 2.33 | 1.11 | 0.72 |
| Area of Flexural Curve (in-lbs) | 647. | 785. | 833. | 348. | 329. |
| Critical Strain | 0.20% | 0.21% | 0.21% | 0.12% | 0.11% |
| Hardness Rockwell-A | 77. | 76. | 81. | 76. | 82. |
| Wear ($10^{-9}$in$^3$) | 207. | 1378. | 592. | 682. | 1711. |

| Specimen of Example | -11- | -12- | -13- | -14- | -15- |
|---|---|---|---|---|---|
| Density in gms/cc | 2.64 | 2.70 | 2.68 | 2.03 | 1.88 |
| Efficiency of Infiltration | 90% | 100% | 68% | 65% | 56% |
| Flexural Strength (ksi) | 26. | 26. | 20. | 21. | 25. |
| Compressive Strength (ksi) | NA* | NA* | NA* | 44. | 76. |
| Elastic Modulus ($10^6$ psi) | 29. | 30. | 31. | 4.0 | 4.0 |
| Modulus of Resilience (in-lb./in$^3$) | 11. | 11. | 6.5 | 57. | 85. |
| Impact Energy (ft-lb./in$^2$) | 0.64 | 0.71 | NA* | 1.13 | 1.13 |
| Area of Flexural Curve (in-lbs.) | 198. | 231. | 153. | 668. | 652. |
| Critical Strain | 0.09% | 0.09% | 0.07% | 0.55% | 0.69% |

-continued

| Hardness Rockwell-A | 79 | 82 | 79 | 49 | 70 |
| Wear (10⁻⁹in³) | NA* | 315. | NA* | 2870. | 707. |

*Data not available

By way of further explanation of some of the terms appearing in the foregoing tables relating to Examples 1 through 15, the value of "Modulus of Resilience" is determined by the following expression:

$$\text{Modulus of Resilience} = \frac{(\text{Flexural Strength})^2}{2 \times \text{Elastic Modulus}}$$

Further, "Wear" was determined under bench test conditions employing standardized specimens of such Examples. That is, in each instance the specimen was formed with an edge having a radius of curvature of 0.160 inches (each specimen being, of course, the same length axially along such edge). The radiused edge was then held against the outer surface of a nitrided cast iron drum with a force of 20.0 lbs. The drum, being of 6.0 inches in diameter, was then driven at 4000.0 surface feet/minute for a period of 2 hours. At the conclusion of the two hours the specimen was removed and the volume of material worn off the specimen was calculated as by, for example, measurement of the chordal flat worn into the radiused edge.

FIGS. 5, 6, 7, 8 and 9 illustrate microstructures of uninfiltrated reaction bonded silicon nitride hosts of various densities, respectively. The respective microstructures of FIGS. 5, 6, 7, 8 and 9 are illustrated at a 500X magnification.

Figure 5:
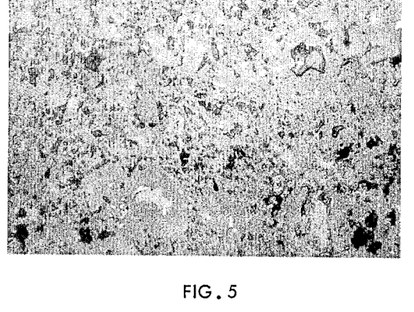
FIGS. 5, 6, 7, 8 and 9 illustrate microstructures of various uninfiltrated hosts.
Figure 6:
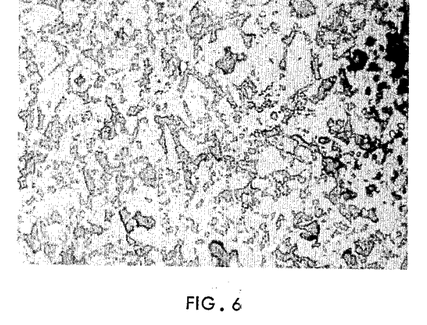

For purposes of correlation, the host represented in FIG. 5 would correspond to the host (and density thereof) employed in forming the biskeletal composites of either previously identified Example -1, Example -10 or Example -13. The host represented in FIG. 6 would correspond generally to the host (and density thereof) employed in forming the biskeletal composite of previously identified Example -2.

Figure 7:
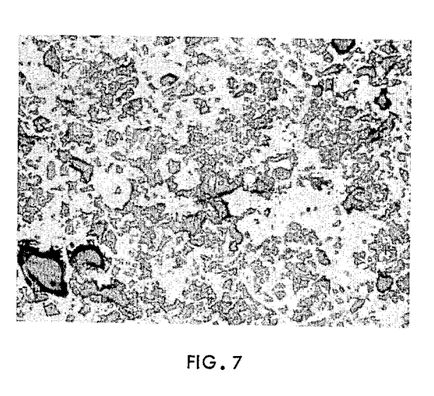
Figure 8:
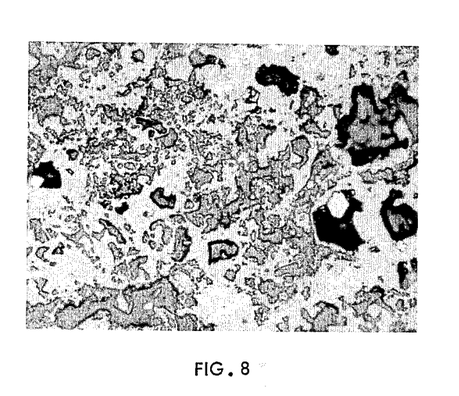
Figure 9:
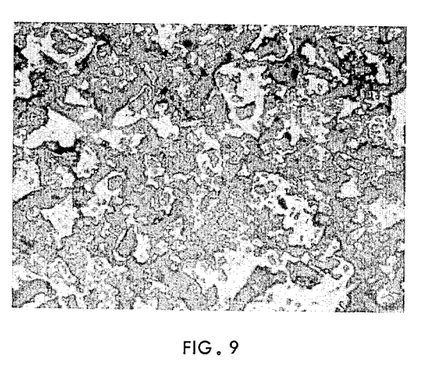

The host represented in FIG. 7 would compare to the host (and density thereof) employed in forming the biskeletal composites of either Examples -3, 6, 7, 8, 9, 11 or 12. The host represented in FIG. 9 would compare to the host (and density thereof) employed in forming the biskeletal composite of previously identified Example -4; while the host represented in FIG. 9 would compare to the host (and density thereof) employed in forming the biskeletal composite of previously identified Example -5.

In the respective microstructures of FIG's. 5 through 9; the very small, lightest or white areas indicate unreacted silicon metal, the light grey areas indicate silicon nitride, and the dark grey and black areas indicate porosity.

Figure 10:
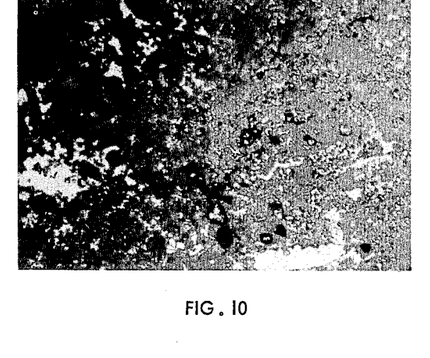
FIGS. 10, 11, 12, 13, 14, 15, 16, 17, 18 and 19 illustrate microstructures of various infiltrated composite products embodying the teachings of the invention.
Figure 11:
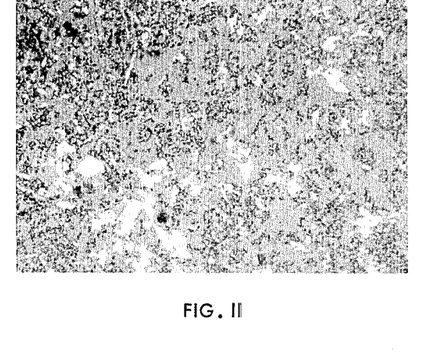
Figure 12:
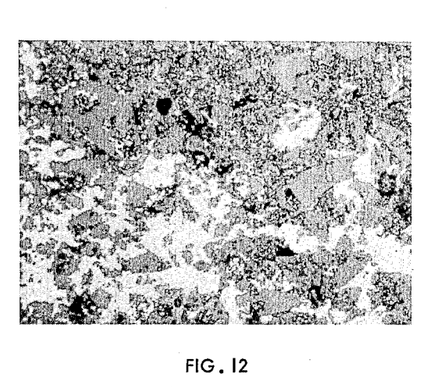
Figure 13:
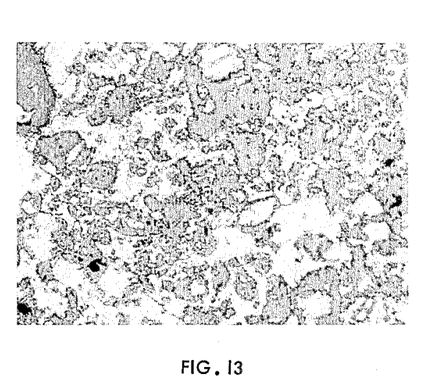
Figure 14:
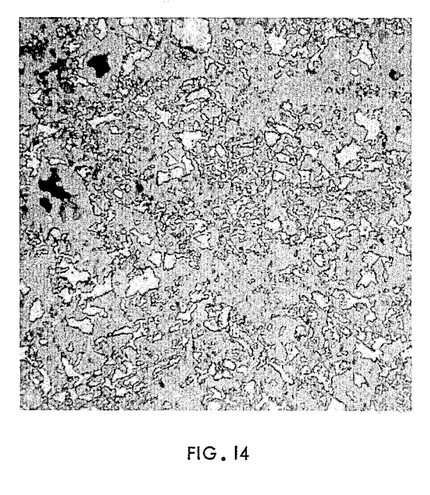
Figure 15:
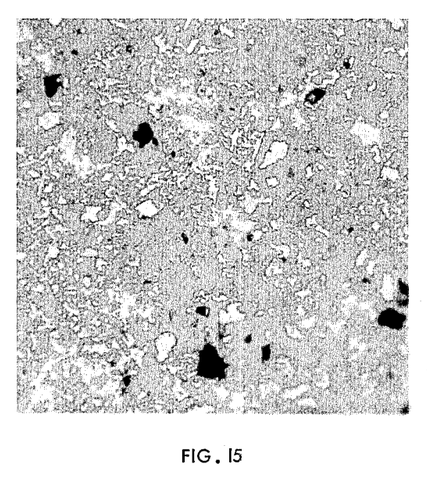
Figure 16:
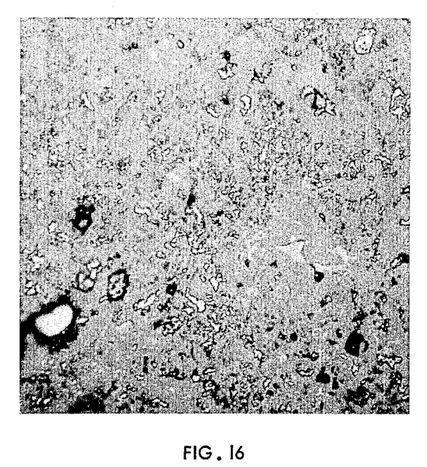
Figure 17:
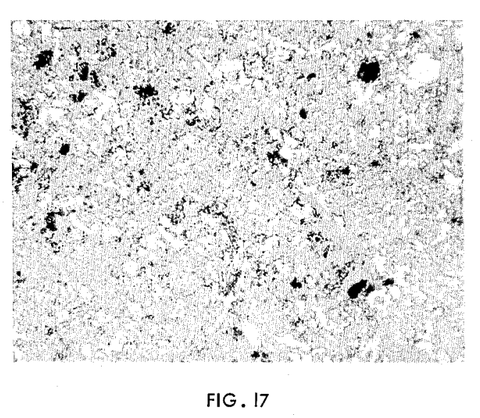

FIGS. 10, 11, 12, 13, 14, 15, 16 and 17 illustrate microstructures of infiltrated biskeletal composites employing reaction bonded silicon nitride hosts of varying densities and varying infiltrants. The respective microstructures of FIGS. 10–17 are illustrated at a 500X magnification. For further identification and correlation, the microstructure in FIG. 10 is that of a specimen of previously identified Example -1; the microstructure in FIG. 11 is that of a specimen of previously identified Example -3; the microstructure in FIG. 12 is that of a specimen of previously identified Example -8; the microstructure in FIG. 13 is that of a specimen of previously identified Example -5; the microstructure in FIG. 14 is that of a specimen of previously identified Example -9; the microstructure in FIG. 15 is that of a specimen of previously identified Example -8; the microstructure in FIG. 16 is that of a specimen of previously identified Example -10; and the microstructure in FIG. 17 is that of a specimen of previously identified Example -12. In each of FIGS. 10 through 17, the grey areas represent silicon nitride, the white areas represent the skeletal infiltrant, while the black areas represent porosity. However, it should be noted that the black areas in FIG. 17 designate void spaces which did not result during infiltration but rather the creation of such voids resulting from loss of some portions of the specimen during the polishing operation in preparing the specimen.

Figure 18:
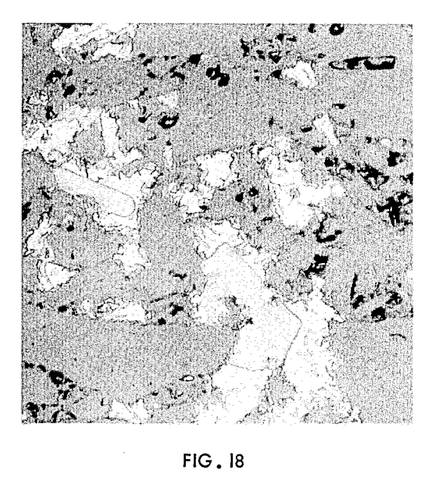
Figure 19:
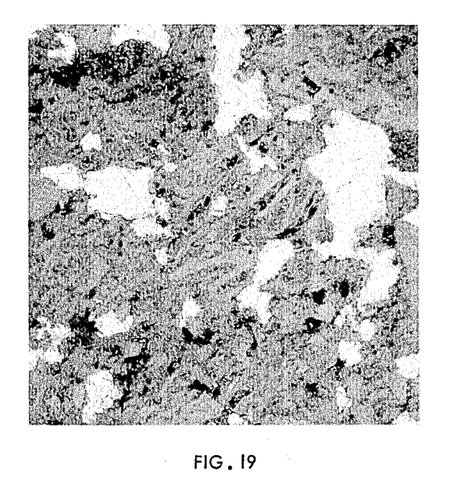
Figure 20:
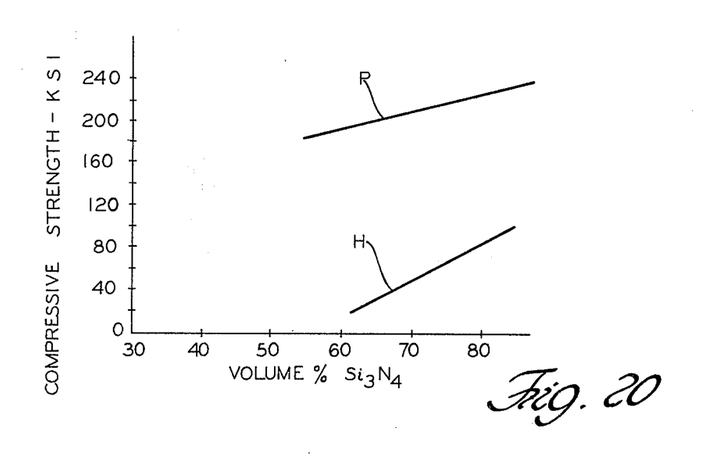
FIGS. 20, 21, 22, 23 and 24 are graphs depicting the influence which an infiltrant has, in comparison to an uninfiltrated host, upon respective physical characteristics.
Figure 21:
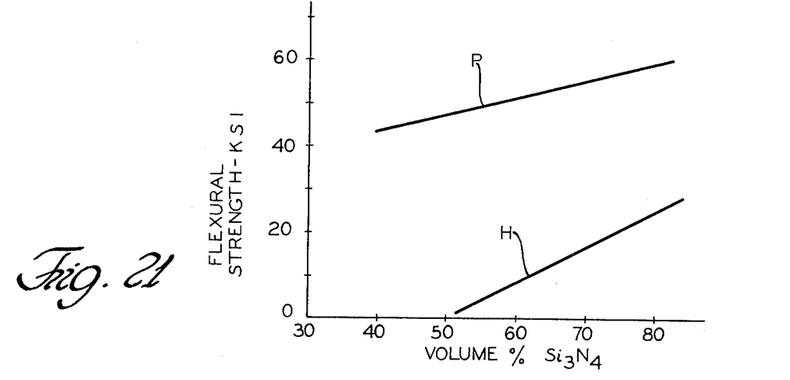
Figure 22:
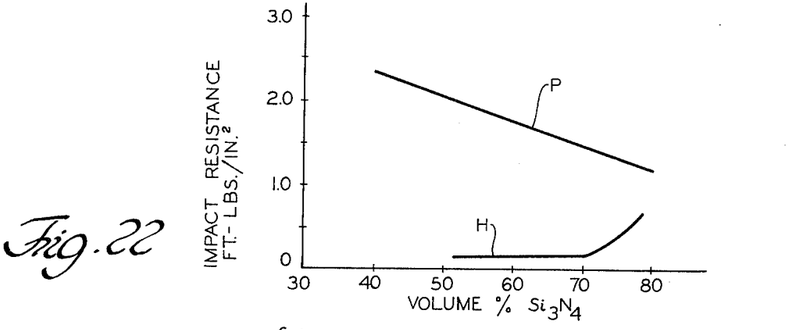
Figure 23:
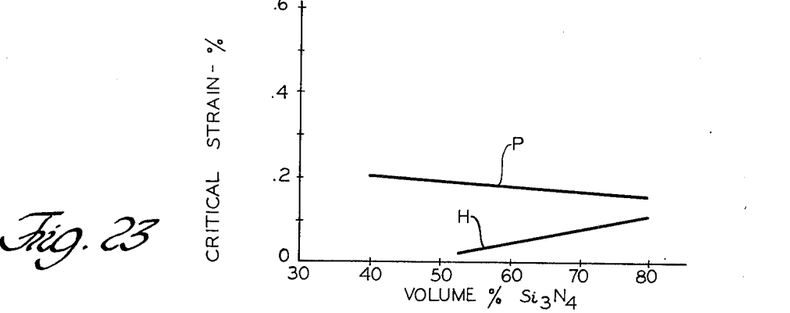
Figure 24:
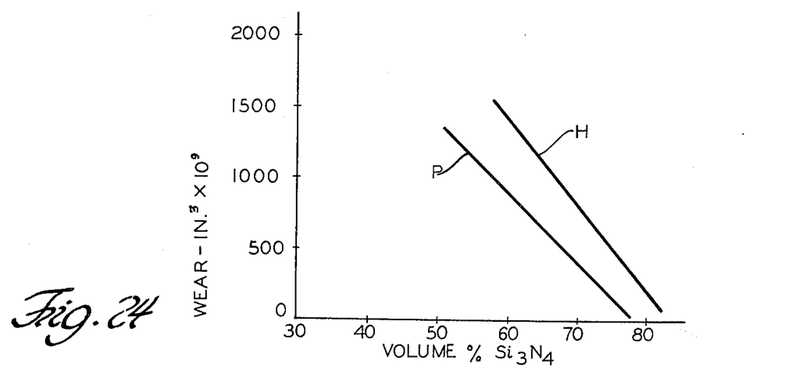

FIGS. 18 and 19 illustrate microstructures, at 500X magnification, of infiltrated biskeletal composites employing carbon or graphite as the skeletal host and a metal infiltrant. The microstructures of FIGS. 18 and 19 are of specimens of previously identified Example -15 and Example -14, respectively. In FIGS. 18 and 19: the dark grey areas designate carbon or graphite; the lighter areas indicate the infiltrant; and the black areas represent porosity.

In view of the foregoing as well as other related tests and evaluations, it appears that when the infiltrant, such as aluminum (or one of its alloys), is infiltrated into a silicon nitride skeletal host and the temperature during such infiltration process is maintained until thermodynamic equilibrium is approached, a mixture of aluminum metal and silicon nitride becomes chemically converted to a mixture of aluminum nitride and silicon metal resulting in the formation of a relatively thick film of aluminum nitride at the interface between the original host material and the infiltrant infiltrated therein. In this connection, it has also been determined that a saturated alloy of silicon in aluminum will restrict or minimize the formation of such an aluminum nitride film while an unalloyed aluminum favors more extensive formation of the aluminum nitride film.

The composite materials of the invention in which a relatively thin film is formed during infiltration of a metallic material into a porous ceramic material, differ from composites of similar composition made by prior art powder metallurgy in that in the prior art all or most of the aluminum, for example, reacts with the silicon nitride (or graphite if such is the ceramic material) to form the aluminum nitride (or aluminum carbide), leaving a material whose microstructure consists of aluminum nitride, a high-silicon alloy devoid of aluminum, and the excess silicon nitride (or aluminum carbide and the excess graphite only). Therefore, the manufacture of composite multi-skeletal materials as are obtained by the rapid infiltration through the agency of a mechanical infiltrator as herein disclosed, and further by conducting such infiltration with a restricted or limited quantity of the infiltrant, as compared to the prior art method bath-type impregnation or infiltration, which is made possible because of the mechanical infiltrator, produces a material or product in which the desirable phases (such as silicon nitride connected skeleton, ductile aluminum-alloy connected skeleton, and the interface between the two consisting of a thin continuous film of aluminum nitride; or, in the case of a graphite host: connected skeleton of graphite, ductile connected skeleton of ductile aluminum alloy, and the interface between the two consisting of a thin continuous film of aluminum carbide) are allowed to coexist even though they are not in thermodynamic equilibrium with the added benefit that the thickness of the aluminum nitride (or aluminum carbide) film is controlled. Such control of the film thickness may be accomplished, in turn, by the selection and control of: (a) the temperature of the infiltration, (b) the rapidity of the infiltration, and (c) in the case of silicon nitride and aluminum compositions, the amount of silicon initially present within the aluminum alloy to be infiltrated.

Further, FIGS. 20 through 24 graphically illustrate the influence of the composition on various physical properties. In each of such Figures reaction bonded silicon nitride is employed as the porous host and A13 aluminum alloy is employed as the infiltrant and comparative curves are presented for the particular characteristic being tested for both the uninfiltrated host as well as the infiltrated composite biskeletal product. That is, in each of FIGS. 20–24, the curve or line identified as H ("host") represents the measured characteristic of the uninfiltrated host, while the curve or ine identified as P ("product") represents the resulting infiltrated composite product.

As the various graphs indicate, in each instance the infiltrated product exhibits superior properties. Further, with specific reference to FIG. 24, it should be noted that the indicated difference in the rate of wear becomes even of greater significance in those instances where the respective materials are employed as rubbing type seals or bearings within a machine where the resulting wear debris remains within the machine so as to, in turn, contribute to the overall wear of the machine itself.

During this testing, it was noted that, in some specimens, small surface cracks were propagated. While these cracks do not affect the structural integrity of the composite, there are some environments, especially those involving a high degree of rubbing wear, in which the presence of such minor cracks is somewhat undesirable. Efforts were therefore made to discover the reason for the cracking and to devise a method to eliminate it for those uses for which it is undesirable. Initial study of the infiltration process indicated that the cracks were propagated during the cooling and solidification step.

Analysis of the effects of the cooling the parts indicated that the differences in the coefficients of thermal expansion of the infiltrant, the infiltrated host, and the material of the pressure applying press created differential thermal contraction stresses at points of contact between the cooling materials. Such points of contact exist when a web of pure infiltrant remains between parts after infiltration of a multiplicity of parts in the same press and when parts are cooled and solidified in the press.

In the case of multiple part forming there is a further tendency to propagate cracks since mechanical means must be used to separate the parts and to remove excess infiltrant. This added step is undesirable from the standpoint of the manufacturing cost of parts infiltrated according to this invention as well as from the standpoint of structural integrity of the infiltrated parts.

In both cases the problem was seen to exist due to the cooling of the infiltrated parts in place under pressure. This procedure had been followed since it was deemed likely that bubbles of trapped gas in the pressurized infiltrant would displace an excessive amount of infiltrant if allowed to expand by relaxation of the applied load. Further testing was carried out to effect a determination that this was not so.

In one test silicon nitride was infiltrated with copper and aluminum alloys and solidified under pressure as has been previously described. After removing the test samples from the press, they were placed in a furnace at a temperature approximately 100° F. above the liquidus temperature of the infiltrant for one hour.

By this melting the residual differential thermal contraction stresses were eliminated as the excess infiltrant was freed, and expanding trapped gas displaced a small amount (1 to 17% by volume) of the infiltrant from the host. It was observed, as can be seen in the test results following, that this loss of infiltrant did not materially affect the infiltration efficiency of the test samples.

Sample 1

| DENSITY | | INFILTRATION EFFICIENCY | | | |
|---|---|---|---|---|---|
| As Infiltrated | After Remelt | As Infiltrated | After Remelt | Vol. % $Si_3N_4$ | Infiltrant Alloy |
| 3.03 gms/cc | 3.02 gms/cc | .91 | .89 | 77% | F132 |

Sample 2

| DENSITY | | INFILTRATION EFFICIENCY | | | |
|---|---|---|---|---|---|
| As Infiltrated | After Remelt | As Infiltrated | After Remelt | Vol. % $Si_3N_4$ | Infiltrant Alloy |
| 3.05 gms/cc | 3.03 gms/cc | .92 | .90 | 77% | K201 |

Similar results were observed in a second test in which silicon nitride was also infiltrated with copper and aluminum alloys but in which solidification was accomplished after pressure release. Again residual stresses were eliminated by freeing the excess infiltrant from pressurized contact. With the excess in the molten state a wide variety of mechanical separating means known in the art can be employed to separate individual infiltrated parts from each other and the press without imposing loads which will produce residual stresses or cracks in the parts.

For clarity of presentation, the invention, in all of its various aspects, has been disclosed employing aluminum or aluminum alloy as the infiltrant and reaction bonded silicon nitride as the host, as illustrative, primarily, of the preferred embodiments thereof. However, it is believed that the invention is not that limited in scope and there is no intention to place any limitation on the invention herein disclosed other than that as expressed by the claims, appended hereto, and the equivalents thereof.

For example, in its broad aspect, the invention teaches the formation of a multi-skeletal composite product. The term, multi-skeletal, is employed in that it is highly probable that in some situations it might be desirable to, for example, employ a monoskeletal host and to from one side thereof infiltrate a first infiltrant to a first depth in order to thereby create a first set of physical characteristics at that one side and infiltrate a second and different infiltrant as from the opposite side of the host to hereby create a second set of physical characteristics. In such an arrangement, the two separate infiltrants could each be considered as defining a separate and distinct skeleton while the host would, of course, define the third skeleton.

Also, even though specific microstructures of metal infiltrants other than those already described have not been shown, many such other metals are obviously suited for infiltration. For example, mechanical infiltration of silver has been successfully accomplished within a ceramic skeletal host. Such composite product could well be used as in surgical implantations since the silver, even though providing toughness and electrical conductivity (if needed), is bacteriostatic.

Further, with the method and apparatus herein disclosed, it becomes possible, to a great extent, to control the degree or percentage of infiltration of the total void volume of the porous host. Therefore, it becomes possible, for example, to infiltrate to a degree resulting in a particular percentage of host porosity remaining and then, by subsequent mechanical infiltration, to mechanically infiltrate a second substance which would (if the substance were chosen for each effect) enhance the lubricity of the composite product.

The teachings herein disclosed enable the achievement of many important goals. For example, it now becomes possible and practical to form a composite product of multiskeletal characteristics regardless of the material selected as the porous host or the infiltrant and regardless of the wetting or non-wetting characteristics thereof because the success of the filtration process does not depend on achieving wetting, as is most often the case with the prior art. The invention employs a principle of positive, and preferably mechanical, displacement of the infiltrant to force it into the porous host.

The temperature at which such infiltration is accomplished can be significantly lower than that which the prior art employs in attempts to form cermets or composite products as by hot pressing of powdered mixtures or by immersion within an evacuated chamber. Consequently, because of such lower temperatures the extent of any reaction between the material forming the porous host and the material forming the infiltrant can be reduced, if such is desired in the resulting product. However, because the actual time of infiltration can be varied, in accordance with the teachings of the invention, it also becomes possible to either further reduce or even increase the extent of any such boundary reaction as by either increasing or decreasing the rapidity of displacement and infiltration of the infiltrant.

Although only a select number of preferred embodiments of the invention have been disclosed and described, it is apparent that other embodiments and modifications of the invention are possible within the scope of the appended claims.

We claim:

1. A method of making a composite material comprising a porous ceramic skeletal body and a metallic infiltrant material filling the pores of the skeletal body including the steps of:
   selecting a porous skeletal ceramic host;
   selecting a material to be infiltrated within the pores of the porous host;
   placing the porous skeletal host within a press having a plunger, the host body being surrounded about its periphery by a peripheral sealing means substantially impervious to liquid metal, a chamber being formed at one side of the host generally inwardly of the peripheral sealing means;
   placing a predetermined quantity of a metallic material, to be infiltrated into the porous host, into the chamber adjacent the host body;
   applying an end plate sealing means to the peripheral sealing means so as to completely enclose the chamber, at least a portion of the end plate sealing means being deformable;
   placing the press plunger against the end plate sealing means;
   heating the metallic material at least to its liquidus temperature;
   applying force to the plunger to cause the end plate sealing means to deform towards the host and positively displace the peripheral sealing means, thereby reducing the volume of the chamber and displacing the liquid material into the porous skeleton structure; and
   maintaning the force on the plunge until the chamber's volume has been sufficiently reduced to accomplish the desired degree of infiltration.

2. A method according to claim 1 and further comprising the step of continuing the application of a force to said plunger for a length of time sufficient to permit the infiltrated molten metal to attain its solidus temperature before the force is removed from said plunger.

3. A method according to claim 3 and further comprising the steps of releasing said force, discontinuing the heating of said composite material, and allowing said material to cool to at least the solidus temperature of said metallic material.

4. A method according to claim 1 and further comprising the steps of removing said composite material from said chamber, reheating said composite material to at least the liquidus temperature of said metallic material, discontinuing the heating of said composite material, and allowing said material to recool to at least the solids temperature of said metallic material.

* * * * *

UNITED STATES PATENT AND TRADEMARK OFFICE
CERTIFICATE OF CORRECTION

PATENT NO. : 4,033,400
DATED : 7/5/77
INVENTOR(S) : Wm. E. Gurwell; Amos J. Shaler It is certified that error appears in the above-identified patent and that said Letters Patent are hereby corrected as shown below:

Col. 6, line 49: "$2 \times 10^{116}_{-4} \, cm.^{4}_{2}/sec.^{2}$" should read --- $2 \times 10^{-4} \, cm.^{2}/sec.$ ---

Col. 8, line 61: After "cermet" insert ---58--- and delete ---height---.

line 65: Omit "50" after the period.

Col. 13, line 23: "ine" should read ---line---.

Col. 15, line 18: "each" should read ---such---.

Col. 16, line 32: "plunge" should read ---plunger---.

line 51: "solids" should read ---solidus---.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*